United States Patent
Mathur

(10) Patent No.: US 11,151,269 B2
(45) Date of Patent: Oct. 19, 2021

(54) REGULATION-COMPLIANT PROCESSING OF QUERIES AND STORING OF DATA IN AN ON-DEMAND ENVIRONMENT

(71) Applicant: salesforce.com, inc., San Francisco, CA (US)

(72) Inventor: Rohitashva Mathur, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 161 days.

(21) Appl. No.: 15/879,101

(22) Filed: Jan. 24, 2018

(65) Prior Publication Data

US 2019/0228171 A1    Jul. 25, 2019

(51) Int. Cl.
     *G06F 16/00*      (2019.01)
     *G06F 21/62*      (2013.01)
     *G06F 16/951*     (2019.01)
     *G06F 16/242*     (2019.01)

(52) U.S. Cl.
CPC ........ *G06F 21/6218* (2013.01); *G06F 16/242* (2019.01); *G06F 16/951* (2019.01)

(58) Field of Classification Search
CPC ... G06F 16/242; G06F 16/951; G06F 21/6218
USPC .................................................. 707/600–899
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

International Search Report & Written Opinion for International Application No. PCT/US19/14571 dated Apr. 18, 2019, 12 pages.

(Continued)

*Primary Examiner* — Michelle N Owyang
(74) *Attorney, Agent, or Firm* — Jaffery Watson Mendonsa & Hamilton LLP

(57) ABSTRACT

In accordance with embodiments, there are provided mechanisms and methods for facilitating regulation-compliant processing of queries in an on-demand services environment according to one embodiment. In one embodiment and by way of example, a method includes receiving a query having first information not permitted to be stored per a regulation and second information permitted to be stored, and parameterizing the query into a parameterized query to replace the first information with parameters, where the first information includes data types. The method further includes annotating the parameters with decisions based on data properties correspondingly associated with the data types being represented by the parameters, and generating a final query based on the annotated parameters such that the final query is capable of being executed based on the annotated parameters and without storing the first information.

18 Claims, 7 Drawing Sheets

(56) References Cited

U.S. PATENT DOCUMENTS

| | | | |
|---|---|---|---|
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,289,976 | B2 | 10/2007 | Kihneman et al. |
| 7,340,411 | B2 | 3/2008 | Cook |
| 7,620,655 | B2 | 11/2009 | Larsson et al. |
| 8,024,339 | B2 * | 9/2011 | Barker ............... G06F 21/6245 707/736 |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0152102 | A1 | 10/2002 | Brodersen et al. |
| 2002/0161734 | A1 | 10/2002 | Stauber et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachadran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0088545 | A1 | 5/2003 | Subramaniam et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0191743 | A1 | 10/2003 | Brodersen et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0139043 | A1 * | 7/2004 | Lei ...................... G06F 21/6227 |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2006/0288183 | A1 * | 12/2006 | Boaz ................... G06F 11/1451 711/164 |
| 2008/0270370 | A1 * | 10/2008 | Castellanos ......... G06F 21/6227 |
| 2009/0177744 | A1 | 7/2009 | Marlow et al. |
| 2010/0241641 | A1 * | 9/2010 | Byun .................. G06F 21/6254 707/757 |
| 2011/0313981 | A1 * | 12/2011 | Ben-Natan .......... G06F 21/6227 707/694 |
| 2014/0101299 | A1 * | 4/2014 | Cherel .................... G06F 9/468 709/223 |
| 2018/0004978 | A1 * | 1/2018 | Hebert ................ G06F 21/6254 |
| 2019/0114341 | A1 * | 4/2019 | Schukovets ........... G06F 16/221 |
| 2019/0164061 | A1 * | 5/2019 | Freed ........................ G06N 5/04 |
| 2019/0197217 | A1 * | 6/2019 | Donovan ................ G06F 21/30 |
| 2019/0213350 | A1 * | 7/2019 | Klein .................. G06F 21/6245 |

OTHER PUBLICATIONS

International Preliminary Report on Patentability for International Application No. PCT/US19/14571 dated Aug. 6, 2020, 9 pages.

* cited by examiner

REGULATION-COMPLIANT PROCESSING OF QUERIES AND STORING OF DATA IN AN ON-DEMAND ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitate regulation-compliant processing of queries and storing of data in an on-demand services environment.

BACKGROUND

Conventional techniques are regarded as inefficient and inaccurate as they often rely on encryption and decryption of user-specific data. Such conventional techniques incapable of true reproduction since data properties often change.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
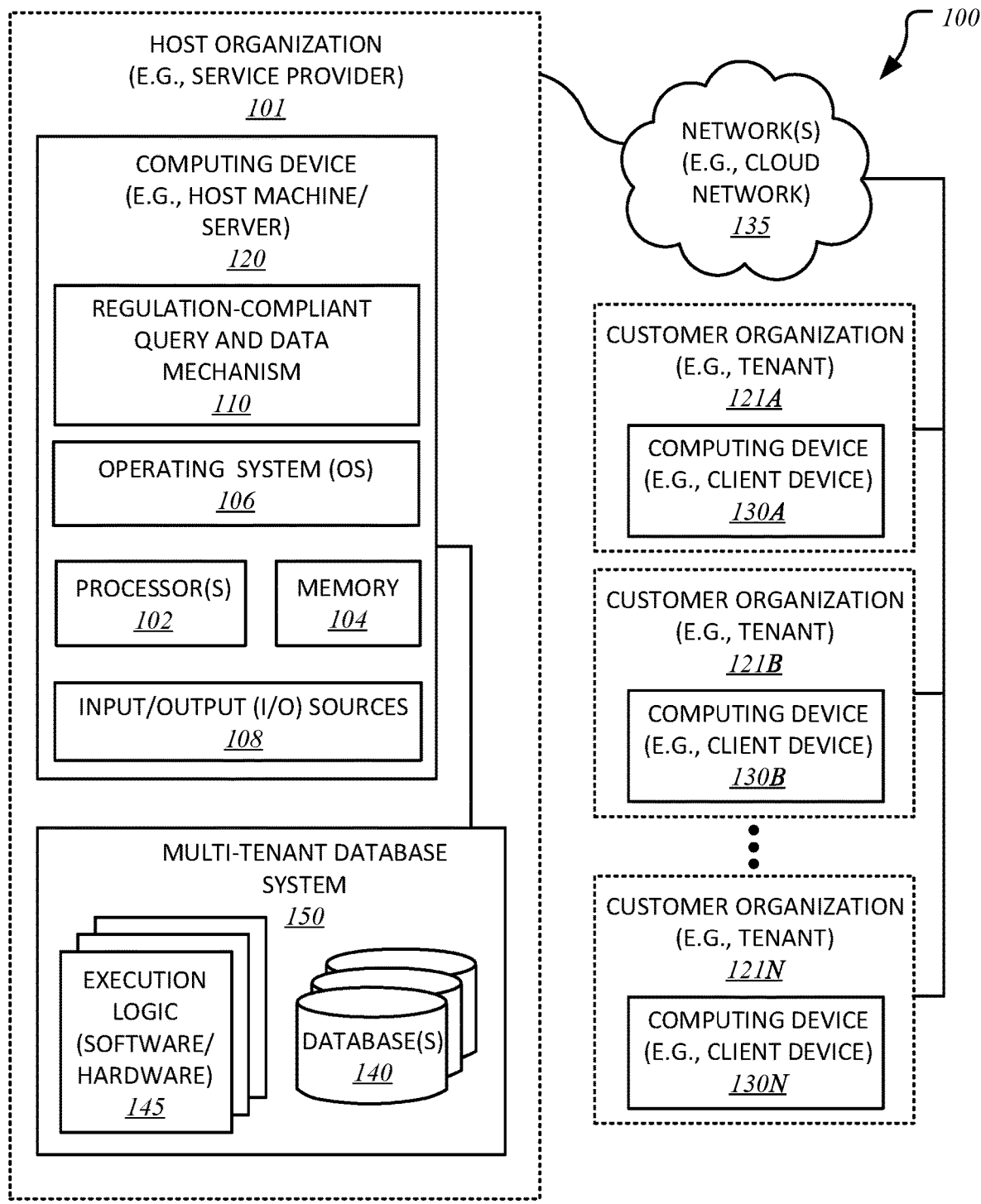
FIG. 1 illustrates a system having a computing device employing a regulation-compliant query and data mechanism according to one embodiment.

In accordance with embodiments, there are provided mechanisms and methods for facilitating regulation-compliant processing of queries in an on-demand services environment according to one embodiment. In one embodiment and by way of example, a method includes receiving a query having first information not permitted to be stored per a regulation and second information permitted to be stored, and parameterizing the query into a parameterized query to replace the first information with parameters, where the first information includes data types. The method further includes annotating the parameters with decisions based on data properties correspondingly associated with the data types being represented by the parameters, and generating a final query based on the annotated parameters such that the final query is capable of being executed based on the annotated parameters and without storing the first information.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Embodiments provide for a novel technique for processing of queries and storing of data associated with such queries in one or more ways that are general data protection regulation (GDPR)-compliant. For example, it is well-known that much of user-specific data (e.g., names, addresses, interests, dates of birth, etc.) associated with or received as part of queries is not to be stored anywhere and used only in a limited matter for transient purposes.

In one embodiment, a novel GDPR-compliant technique for query/data logging, executing, and re-executing, etc., is provided such that any pertinent user-specific data is not stored; nevertheless, properties of its parameters are intelligently remembered and used for generation and execution for final queries without being inaccurate or inefficient, such as in terms of time, memory, etc.

It is contemplated and to be noted embodiments are not limited to merely GDPR and that this novel technique may be used with any number and type of other similar regulations where user-supplied or user-specific or any certain type of data is to be protected. Similarly, embodiments are not limited to certain types of queries or query languages, such as Salesforce Object Query Language (SOQL), Salesforce Object Search Language (SOSL), Sequential Query Language (SQL), etc. However, for the sake of brevity clarity, SOQL may be used as an example throughout this document, but that embodiments are not limited as such.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a regulation-compliant query and data mechanism 110 according to one embodiment. In one embodiment, regulation-compliant query and data mechanism ("regulation-compliant mechanism") 110 provides for regulation-compliant (e.g., GDPR-compliant) processing of queries and data associated with such queries such that user-supplied (including user-specific) data is protected per the pertinent regulations.

As illustrated, in one embodiment, computing device 120, being part of host organization 101 (e.g., service provider, such as Salesforce.com®), represents or includes a server computer acting as a host machine for employing regulation-compliant mechanism 110 for facilitating smart deployment of metadata packages in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of regulation-compliant mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitations) one or more of tenants or customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitations) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc. In some embodiments, client devices 130A-include artificially intelligent devices, such as autonomous machines including (without limitations) one or more of autonomous vehicles, drones, robots, smart household appliances, smart equipment, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
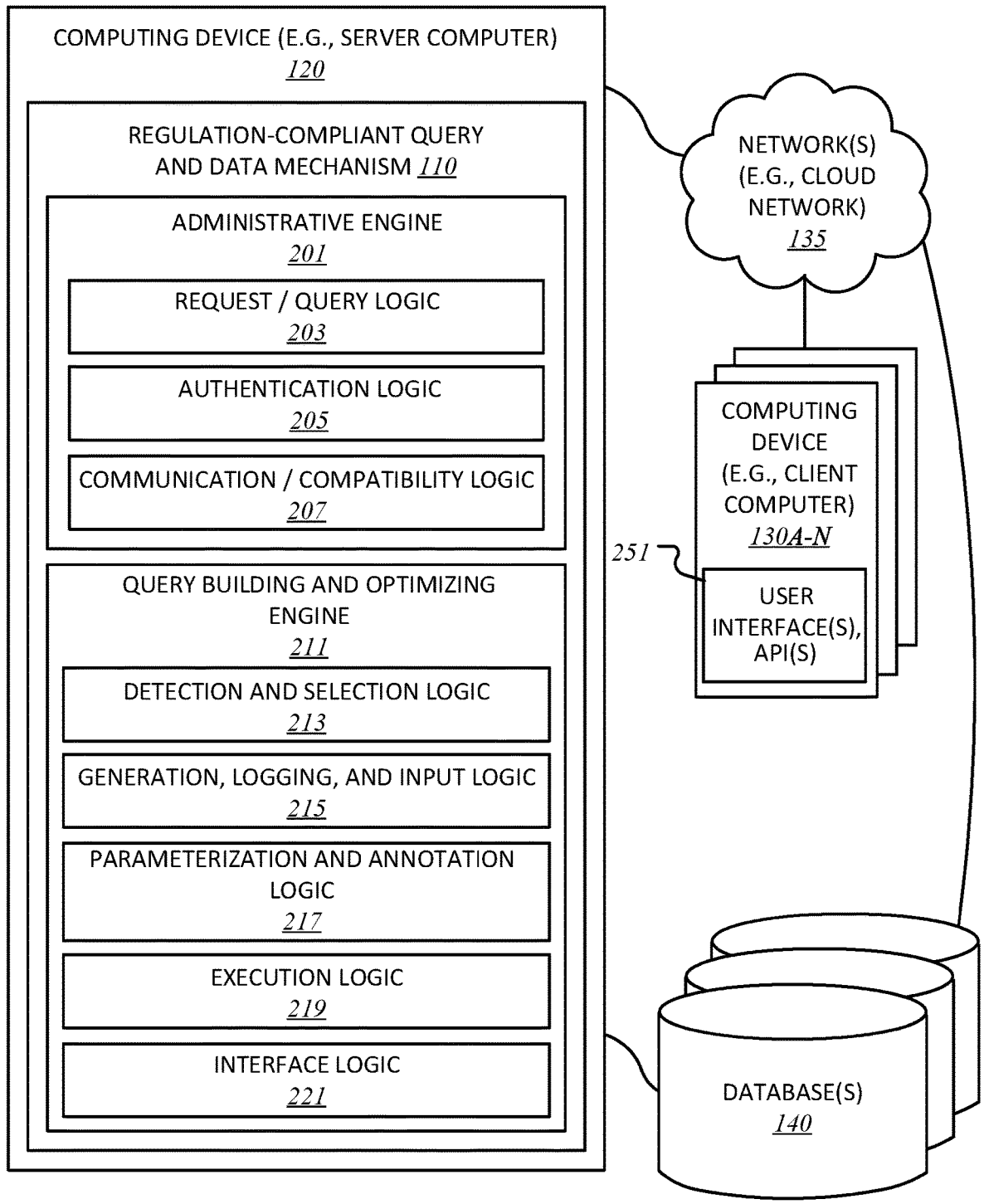
FIG. 2 illustrates a regulation-compliant query and data mechanism according to one embodiment.

FIG. 2 illustrates regulation-compliant query and data mechanism 110 of FIG. 1 according to one embodiment. In one embodiment, regulation-compliant mechanism 110 provides for regulation-compliant processing and storing of queries and data, respectively, where regulation-compliant mechanism 110 includes any number and type of components, such as administration engine 201 having (without limitation): request/query logic 203; authentication logic 205; and communication/compatibility logic 207. Similarly, regulation-compliant mechanism 110 may further include query building and optimizing engine ("QBO engine") 211 including (without limitations): detection and selection logic 213; generation, logging, and input logic ("GLI logic") 215; parametrization and annotation logic ("PA logic") 217; execution logic 219; and interface logic 221.

In one embodiment, computing device 120 may serve as a service provider core (e.g., Salesforce.com® core) for hosting and maintaining regulation-compliant mechanism 110 and be in communication with one or more database(s) 140, one or more client computer(s) 130A-N, over one or more network(s) 135, and any number and type of dedicated nodes. In one embodiment, one or more database(s) 140 may be used to host, hold, or store data including interface details, API documentation, tool information, menus, objects, tables, code samples, HTTP client data, messages, queries, tenant and organization data, etc.

As will be further described in this document, server computing device serving as regulation-compliant server computing device ("regulation-compliant device") 120 is shown in communication with client computing devices ("client devices") 130A-N over one or more network(s) 135 (e.g., cloud network, Internet, etc.). In one embodiment, client devices, such as client device 130A, may be provided user interface 251 as facilitated by interface logic 221. For example, user interface 251 may serve as a layer above and associated with API(s) provided by a service provider (e.g., Salesforce.com®).

Throughout this document, terms like "framework", "mechanism", "engine", "logic", "component", "module", "tool", "builder", "circuit", and "circuitry", may be referenced interchangeably and include, by way of example, software, hardware, firmware, or any combination thereof. Further, any use of a particular brand, word, or term, such as "regulation", "regulation-compliant", "GDPR", "SOQL", "SOSL", "SQL", "query", "data", "parameter", "decision", "generating", "logging", "inputting", "detecting", "selecting", "annotating", "executing", "re-executing", "application programming interface", "API", "user interface", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client device(s) 130A-N, code execution requests, and so forth.

In one embodiment, computing device 120 may implement request/query logic 203 to serve as a request/query interface via a web server or as a stand-alone interface to receive requests packets or other requests from the client device(s) 130A-N. The request interface may further support the return of response packets or other replies and responses in an outgoing direction from computing device 120 to one or more client device(s) 130A-N.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client device(s) 130A-N.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices) 130A-N, over one or more communication mediums, such as network(s) 140.

As previously described, at present, captured and logged queries, such as SOQL, are typically issued by users, using user identifications (user-IDs), where the users represent their tenants in a multi-tenant environment. Any information from the capture of such queries is often used by various organizational teams, such as support teams, performance teams, optimizer teams, etc., for performance of certain crucial functions, such as by inspecting and re-running SOQL, SOSL, etc. However, in capturing the queries, any information associated with such queries is also captured, including information belonging to or specific to users or customers (e.g., tenants) that is not to be logged or stored, such as at database(s) 140, under certain regulations, such as GDPR. For example, user-IDs and other filter values that are part of SOQL may not be stored or logged.

It is contemplated that as service providers (e.g., Salesforce.com®) strive to attain GDPR compliance, they would be prevented from logging any user-specific information that can directly or indirectly impact the ability of multiple teams to troubleshoot issues like performance and correctness.

Conventional techniques, such as tokenization, are regarded as general-purpose in nature in that they provide for replacement of information that is not be exposed under GDPR, but the general-purpose nature of such conventional techniques makes them inefficient and cumbersome to use. For example, these techniques require that the values are first stored and mapped and then they are looked up, which is inefficient and consumes resources like time and memory.

Embodiments provide for a novel technique, as facilitated by regulation-compliant mechanism 110, for a regulation-compliant query scheme (e.g., GDPR-compliant SOQL scheme) for logging, execution, and re-execution of queries and the relevant information through QBO logic 211 to continue supporting development teams that dependent on user-specific information to keep their workflow much the same without exposing, sharing, or storing of any of such sensitive user-specific information. For example, QBO logic 211 provides for a GDPR-based compliance of SOQL and user data logging and usage, while maintaining ease and efficiency in terms of time and usage of current logging and usage implementations.

Further, this novel technique, as facilitated by regulation-compliant mechanism 110 and its QBO logic 211, eliminates any change of breach of user-specific data since no data that can identify the user is stored or logged at all. Further, this novel technique is much simpler and time-efficient, while allowing any development teams to continue with much of their workflow. Further, this novel technique is immune to any changes to the data profile of the actual data, the user, the tenant, etc., which make it a far superior technique over any of the conventional solutions.

In one embodiment, any queries generated by GLI logic 215 and any information detected and analyzed by detection and selection logic 213 are parameterized and annotated by PA logic 217 so that user this novel scheme, instead of logging the user-specific data, for each data item, data properties and decisions are logged or stored though GLI logic 215. These data properties and decisions are generated through parameterization and annotation, as facilitated by PA logic 217, such that any user-specific data is entirely removed from these data properties and decisions while maintaining reference parameters in place of the actual data (for reference purposes) as will be further explained in this document.

In one embodiment, once this log line having data properties and decisions has been logged (or captured as part of this novel scheme), it can then be inputted to another page, as facilitated by GLI logic 215, which accepts the now parameterized SOQL along with any data properties and decisions that each parameter in the SOQL caused to undertake, where this page runs QBO engine 211 in a new mode where the data properties and decisions have already been determined.

In one embodiment, detection and selection logic 213 detects user-supplied query (e.g., SOQL) and user-ID placed through user interface 251 at computing device 130A and received at computing device 120 over network(s) 135 (e.g., cloud network, Internet, etc.). For example, the query and any other relevant information may be detected directly by detection and selection logic 213 or through its object representation. Either way, once the query and the relevant information are detected, GLI logic 215 may then be triggered to generate a final query based on the detected query and the relevant information, while keeping track of each decision that each piece of information caused it to make. In one embodiment, this final query is executed by execution logic 219.

In one embodiment, PA logic 217 is triggered to generate a parameterized version of the query, such as the user-supplied SOQL, which is then logged by GLI logic 215. In having generated this parameterized version, any sensitive user-specific information that is not allowed to be logged or stored per regulations, such as GDPR, are is removed and replaced with parameters for referencing in data properties and decisions. For example, if a user's name (such as John Smith) is disclosed in the SOQL, then, to be GDPR-compliant, the user's name is removed as the SOQL is transformed into a parameterized SOQL by PA logic 217. However, certain decisions may be taken before removing the user's name, such as a decision may be made with regard to the last name Smith as to where to look for or find "Smith" by scanning or selectively accessing one or more tables in database(s) 140 as facilitated by PA logic 217.

It is contemplated that data properties refer to properties associated with a type of data, wherein the properties are used by QBO engine 211 to access that data type in database(s) 140 in the most efficient manner feasible. Examples of data properties associated with a data type name may include the frequency of a given name (e.g., Smith), a total number of names in a table, and the name of the table where the names are stored. Similarly, it is contemplated that a decision refers to a choice made by QBO engine 211 at various stages to query generation to determine how to read certain data type in the most efficient manner feasible. For example, whether to join two or more tables and then filter on them or filter on both tables and join or use nested loops to join the two tables or use hash joins to join the two tables, and/or the like.

Once such decisions choices have been made, such as by QBO engine 211 at various stages to query generation as facilitated by GLI logic 215, any user-specific information that is not to be stored may then be replaced with parameters (such as parameter 1, parameter 2, parameter A, parameter B, etc.) corresponding to the certain decisions based on data types of the user-specific information and their associated data properties as facilitated by PA logic 217. For example, the last name, "Smith", is replaced with a parameter, such as "parameter A" and annotated with its corresponding decision, such as "join two or more tables and filter through both tables", etc. This way, in one embodiment, the user-specific information, such as the last name, from the original query is removed and is smartly replaced with a reference parameter, such as parameter A, in the parameterized query. These parameters are annotated with decisions based on the parameterized query as facilitated by PA logic 217.

In one embodiment, this parameterized version of the query annotated with data properties and the decisions based on data types are then logged or stored as a richly annotated query, such as annotated SOQL, as facilitated by GLI logic 215. As aforementioned, interface logic 221 may then be provided to a user through user interface 251 or APIs, etc., at client device 130A, where this user interface 251 may be used by a user or a program to input this richly annotated SOQL (with user-specific data removed and replaced with parameters in compliance with GDPR or other similar regulations).

In one embodiment, execution logic 219 is then triggered to run the annotated query, such as annotated SOQL, in a processing mode to evaluate the data properties and decisions of the annotated query to allow for execution of the decisions as they correspond to the assigned parameters that are part of the data properties to then trigger GLI logic 215 to generate a final query based on the processed annotated query further based on the pre-supplied information as supplied by the user in the original query. In one embodiment, execution logic 219 the loads and re-executes this final query.

It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from regulation-compliant mechanism 110 to facilitate various embodiments including adding, removing, and/or enhancing certain features. It is contemplated that embodiments are not limited to any technology, topology, system, architecture, and/or standard and are dynamic enough to adopt and adapt to any future changes.

Figure 3:
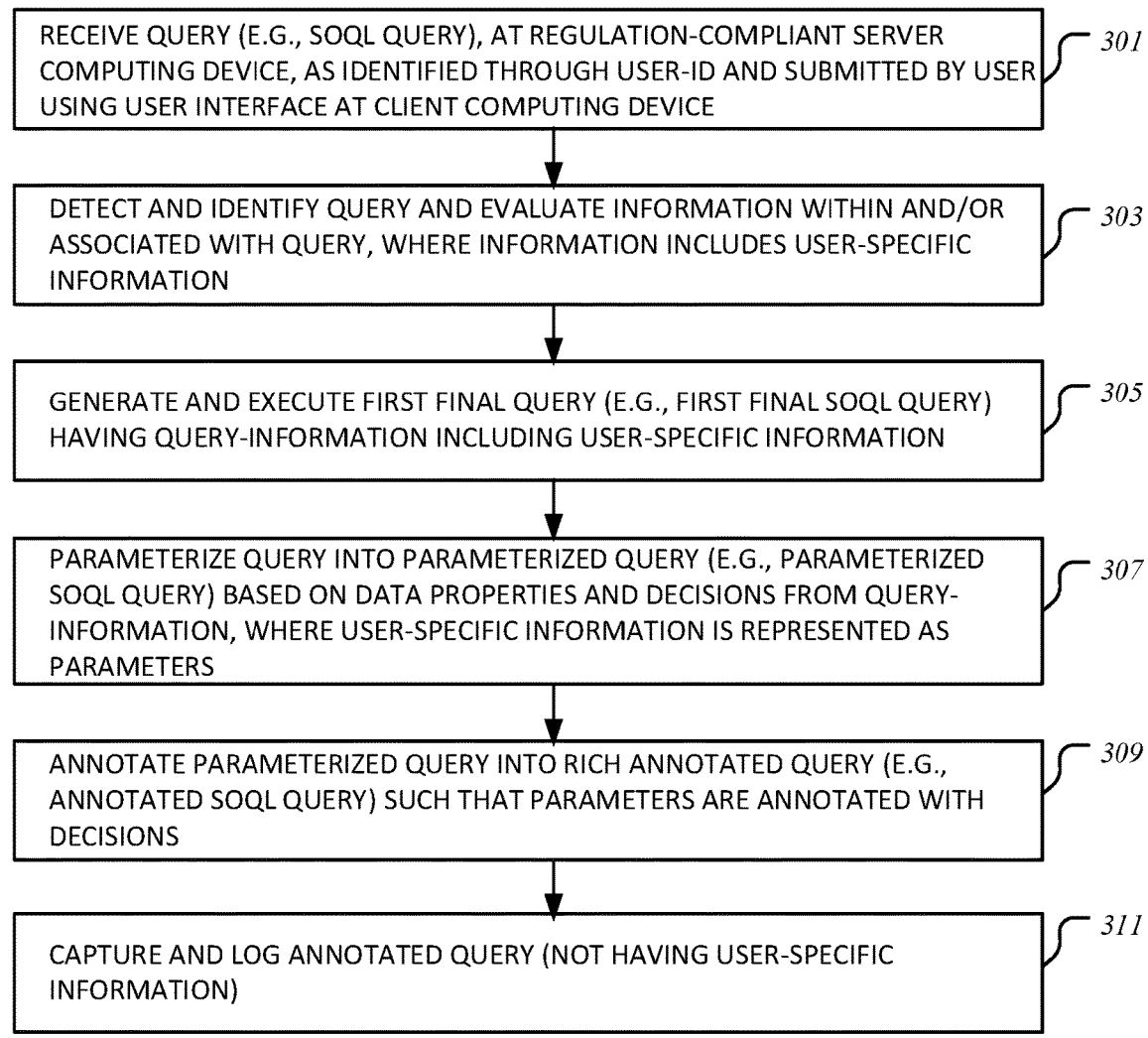
FIG. 3 illustrates a method for facilitating capture of an annotated query according to one embodiment.

FIG. 3 illustrates a method 300 for facilitating capture of an annotated query according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed or facilitated by one or more components of regulation-compliant mechanism 110 of FIG. 1. The processes of method 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Method 300 begins at block 301 with receiving, at a regulation-compliant server device, a query (e.g., SOQL) as identified by a user-ID associated with a user having access to and placing the query at a client device using a user interface. For example, the user represents a tenant in a multitenant environment and additional user-specific information associated with and/or as part of the query, where such user-specific information may include data that can identify the user, such as name, location, address, date of birth, social security number, driver's license number, and/or the like. At block 303, the query is detected and identified either directly though the user-ID or as its object representation, any information contained within and associated with the query is then evaluated, where this information includes user-specific information along with non-user-specific information (e.g., tenant account information, search data, code or syntax, public information about the tenant, etc.).

At block 305, in one embodiment, a first final query is generated and executed based on the information provided with the query, while keeping track of each decision that each of piece of information caused it to make, where, in other words, data properties and their corresponding decisions from within the information are tracked through the process to be used later for annotation purposes. At block 307, a parameterized version (e.g., parameterized SOQL) of the query (e.g., the supplied SOQL) is generated and, block 309, the parameterized query is annotated (either directly or indirectly, in-band or out-of-band, etc.) with data properties and decisions that the supplied information disclosed and caused to undertake. For example, in some embodiments, any user-specific information may be replaced with parameters and associated with their corresponding decisions. In one embodiment, this annotation process generates a richly annotated query (e.g., annotated SOQL). At block 309, this richly annotated query with data properties and decisions is logged and captured.

As described with reference to FIG. 2, a query (e.g., SOQL query) placed by the user at a client computing device may contain information including some which may be stored, while some other which may not be stored to comply with one or more regulations, such as GDPR, etc. For example, it is contemplated that all information, including any user-specific or other information that is not permitted to be stored per the regulation, contains data types, where each data type includes a piece of information, such as names, usernames, passcodes, numbers, addresses, locations, confidential information, privileged data, proprietary details, secrets, etc., that could identify the user or other persons or products or entities and thus such data types may not be stored to comply with any pertinent regulations.

As further discussed with reference to FIG. 2, data properties may be correspondingly associated with data types, such as each data may be associated with at least one or more data properties, where these data properties may be used by the QBO engine 211 of FIG. 2 to access the data types at one or more databases in the most efficient ways possible. For example, a data property associated with a data type (such as a name) may include one or more of frequency at which the name appears in queries, etc., a total number of names in any given table or a table that includes the name, the name or title of the table where various names, including the name, are stored, and/or the like.

Moreover, decisions are based on choices made by QBO engine 211 of FIG. 2 at various stages to query generation to determine how to most efficiently read certain data types. For example, a decision may entail whether to join two or more tables associated with or having a particular data type, filter the two or more tables, join or use nested loops to join the two or more tables, use has joins to join the two or more tables, etc.

Figure 4:
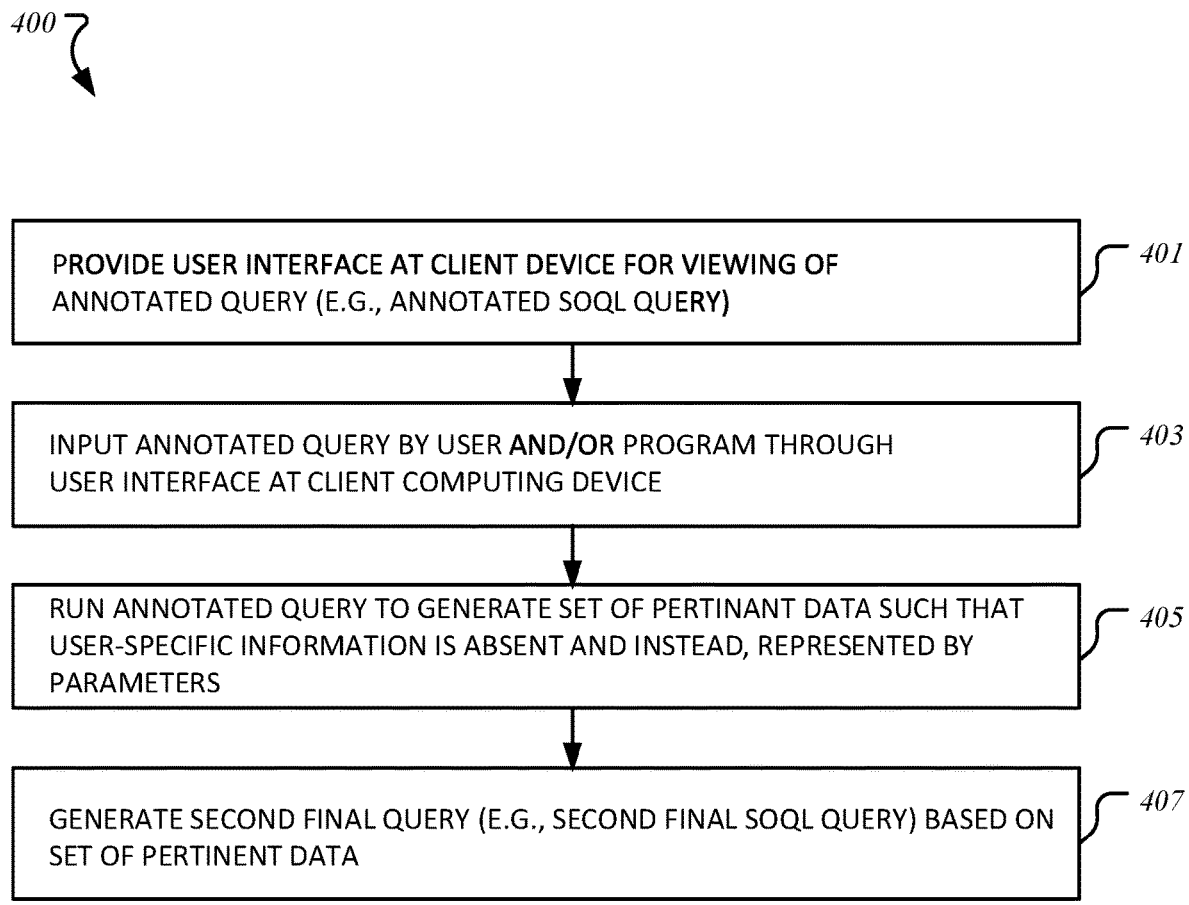
FIG. 4 illustrates a method for facilitating re-execution of a final query based on an annotated query according to one embodiment.

FIG. 4 illustrates a method 400 for facilitating re-execution of a final query based on an annotated query according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of regulation-compliant mechanism 110 of FIG. 1. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter.

Method 400 begins at block 401 with providing a user interface at a client computing device such that the user interface may be used to receive and view the richly annotated query (e.g., annotated SOQL) of FIG. 3. At block 403, this annotated query (which does not have any user-specific data) is then inputted by a user and/or a program accessing the client device, where the user may include a software developer, a programmer, a system administrator, etc., having access to the client computing device. At block 405, the inputted annotated query, having data properties and decisions, is then run in a mode that allows for using the data properties and decisions to generate a set of pertinent data (such as using parameters representing the user-specific information) that may then be used to generate a second final query. At block 407, this set of pertinent data is then used to generate and execute the second final query.

Figure 5:
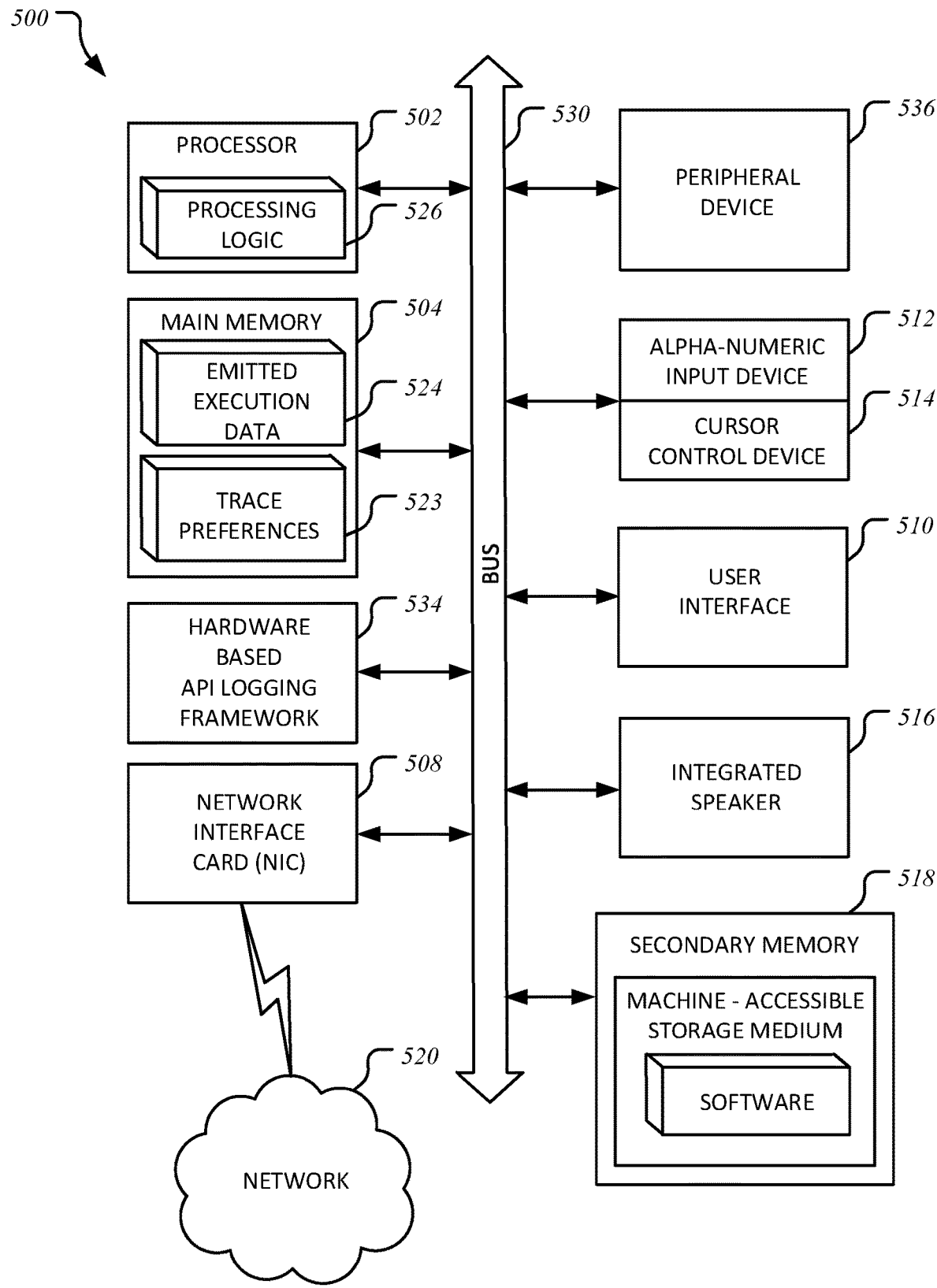
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of query mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of query mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
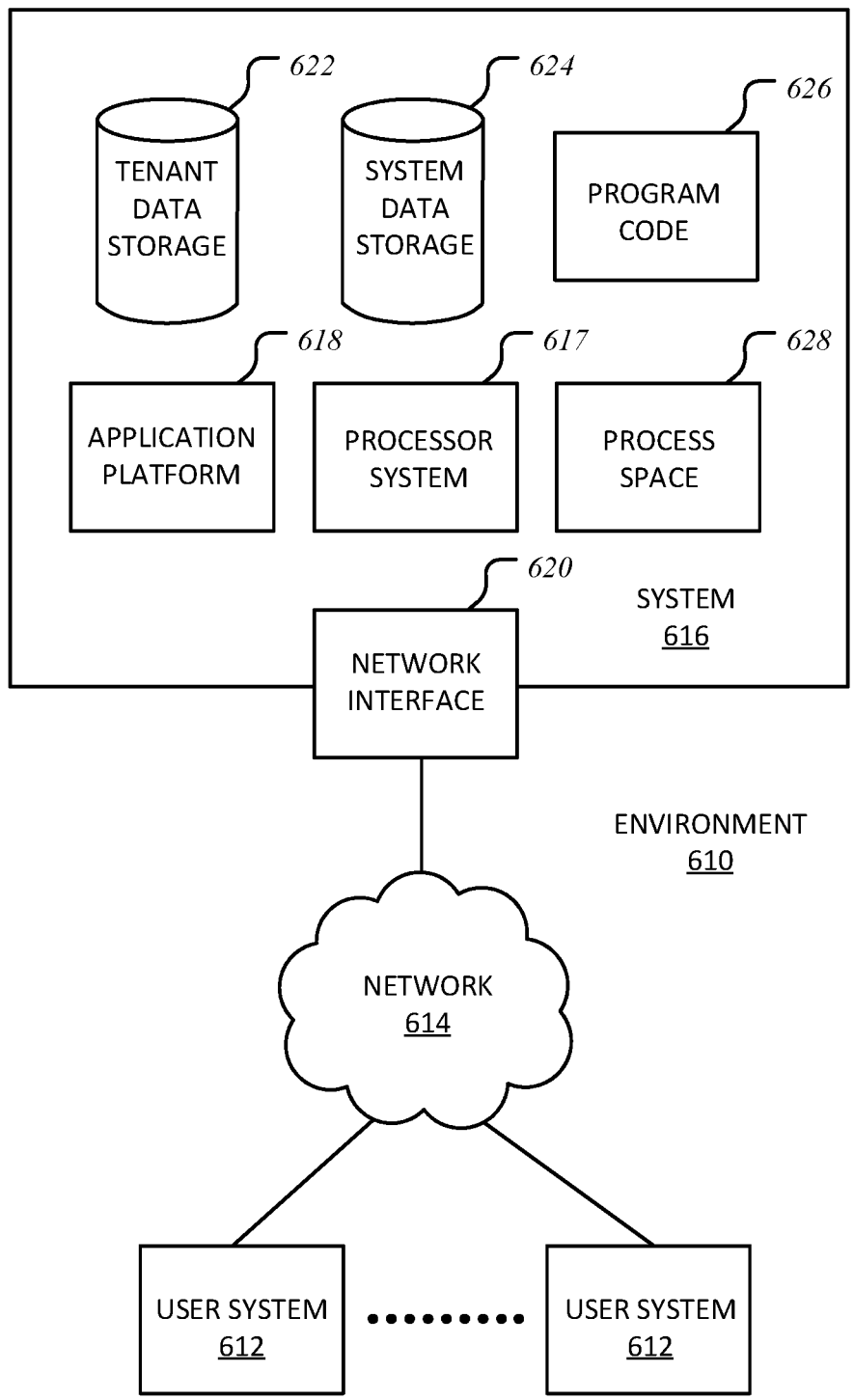
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
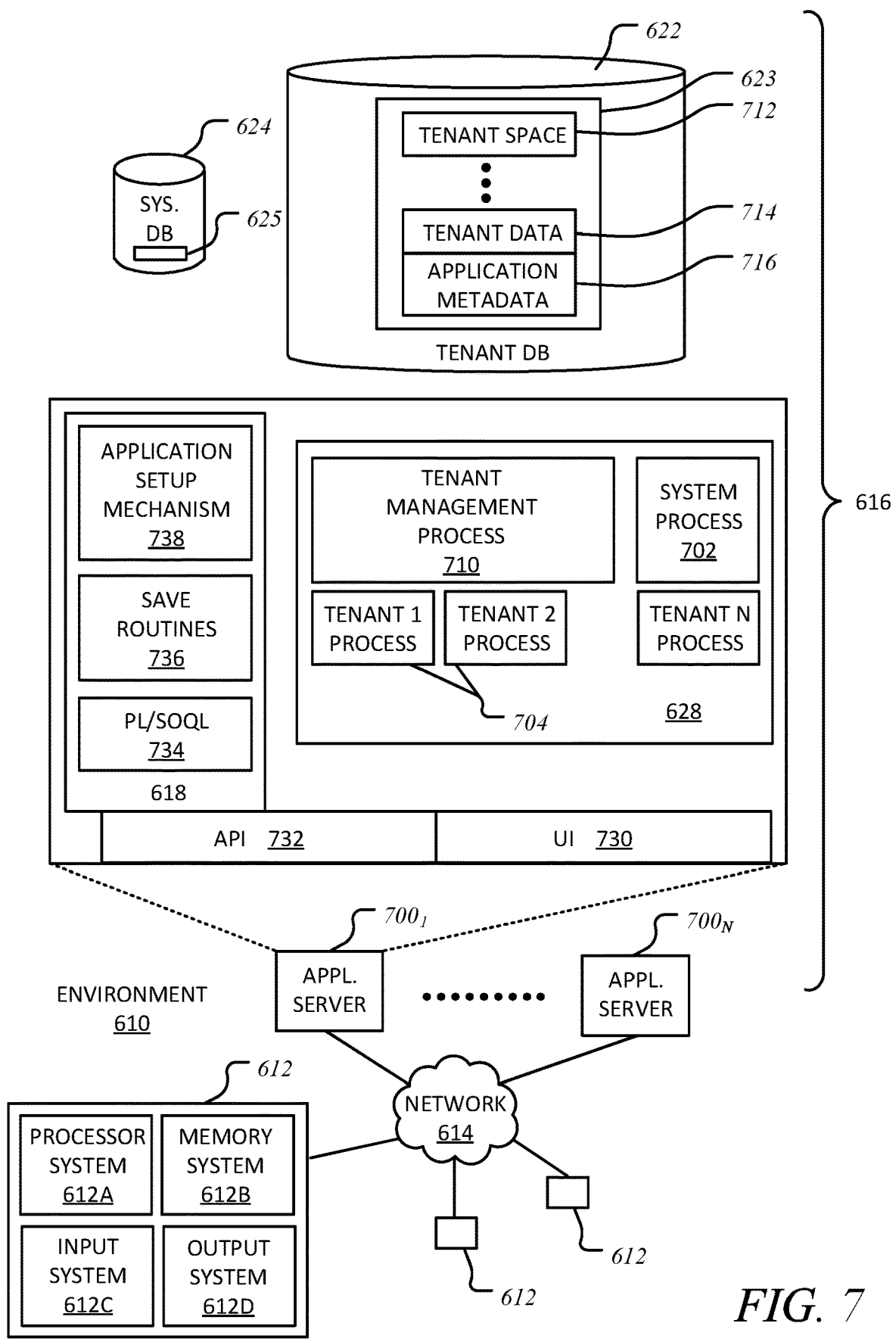
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items may be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:
    receiving, by a data compliance server, a query having first information and second information, wherein the first information incudes sensitive information that is not permitted to be further communicated or stored per a regulation, and wherein the second information is permitted to be further communicated and stored;
    parameterizing, by the data compliance server, the query into a parameterized query to replace the first information with parameters, wherein the first information is occulted and represented by the parameters, wherein parameterization is based on data properties at least partially obtained from metadata associated with the query, wherein the data properties correspond to data types represented by the parameters, wherein the metadata includes historical data relating to the data types, wherein the historical data includes frequency at which the first information is detected in one or more queries;
    transforming, by the data compliance server, the parameterized query into an annotated query such that the parameters are annotated with decisions based on the data properties, wherein the decisions reveal protocols relating to one or more of joining of tables associated with data filtering out of one or more of the tables based on the data properties; and
    generating, by the data compliance server, a final query based on the annotated query, wherein the final query is executed based on the annotated parameters and the annotated query is captured and stored without the first information.

2. The method of claim 1, further comprising executing, by the data compliance server the final query in compliance with the regulation, wherein the regulation includes General Data Protection Regulation (GDPR).

3. The method of claim 1, wherein the query comprises at least one of a Salesforce Object Query Language (SOQL)-based query, a Salesforce Query Search Language (SQSL)-based query, and a Sequential Query Language (SQL)-based query, wherein the final query is identical in structure and generated subsequently to a data fetching query that is generated in response to the query, wherein the data fetching query represents a first final query, while the final query represents a second final query.

4. The method of claim 1, further comprising detecting, by the data compliance server, the first information having data types, wherein the data types are specific to a user representing a tenant in a multi-tenant environment, wherein the query is placed at a client computing device via a user interface, wherein the user interface includes one or more of a graphical user interface (GUI), a web browser, and an application-based interface, and an application programming interface (API).

5. The method of claim 4, wherein the data types of the first information comprise one or more of names, usernames, passcodes, identifying numbers, addresses, geographic locations, proprietary information, privileged information, and confidential material, wherein the data properties are used to access their associated data types in the database, wherein a data property associated with a data type reveals one or more attributes of the data type such that wherein a data type includes a name, the data property of the data type includes one or more of a frequency of usage of the name, a total number of names in a table having the name, and a name of the table where the name is stored.

6. The method of claim 1, wherein the decisions are chosen at various stages of query generation and reveal one or more ways for reading the data types based on their associated data properties, wherein a decision for reading one or more data types includes one or more of joining of tables, filtering of one or more of the tables, using nested loops for joining of two or more of the tables, applying hash joins to join the two or more tables.

7. A database system comprising:
    a data compliance server having a processing device and a non-transitory storage device having instructions, the processing device to execute the instructions to facilitate a mechanism to perform operations comprising:
    receiving a query having first information and second information, wherein the first information incudes sensitive information that is not permitted to be further communicated or stored per a regulation, and wherein the second information is permitted to be further communicated and stored;
    parameterizing the query into a parameterized query to replace the first information with parameters, wherein the first information is occulted and represented by the parameters, wherein parameterization is based on data properties at least partially obtained from metadata associated with the query, wherein the data properties correspond to data types represented by the parameters, wherein the metadata includes historical data relating to the data types, wherein the historical data includes frequency at which the first information is detected in one or more queries;

transforming the parameterized query into an annotated query such that the parameters are annotated with decisions based on the data properties, wherein the decisions reveal protocols relating to one or more of joining of tables associated with data filtering out of one or more of the tables based on the data properties; and generating a final query based on the annotated query, wherein the final query is executed based on the annotated parameters and the annotated query is captured and stored without the first information.

8. The system of claim 7, wherein the operations further comprise executing the final query in compliance with the regulation, wherein the regulation includes General Data Protection Regulation (GDPR).

9. The system of claim 7, wherein the query comprises at least one of a Salesforce Object Query Language (SOQL)-based query, a Salesforce Query Search Language (SQSL)-based query, and a Sequential Query Language (SQL)-based query, wherein the final query is identical in structure and generated subsequently to a data fetching query that is generated in response to the query, wherein the data fetching query represents a first final query, while the final query represents a second final query.

10. The system of claim 7, wherein the operations further comprise detecting the first information having data types, wherein the data types are specific to a user representing a tenant in a multi-tenant environment, wherein the query is placed at a client computing device via a user interface, wherein the user interface includes one or more of a graphical user interface (GUI), a web browser, and an application-based interface, and an application programming interface (API).

11. The system of claim 10, wherein the data types of the first information comprise one or more of names, usernames, passcodes, identifying numbers, addresses, geographic locations, proprietary information, privileged information, and confidential material, wherein the data properties are used to access their associated data types in the database, wherein a data property associated with a data type reveals one or more attributes of the data type such that wherein a data type includes a name, the data property of the data type includes one or more of a frequency of usage of the name, a total number of names in a table having the name, and a name of the table where the name is stored.

12. The system of claim 7, wherein the decisions are chosen at various stages of query generation and reveal one or more ways for reading the data types based on their associated data properties, wherein a decision for reading one or more data types includes one or more of joining of tables, filtering of one or more of the tables, using nested loops for joining of two or more of the tables, applying hash joins to join the two or more tables.

13. A non-transitory computer-readable medium having stored therein on instructions which, when executed, cause a computing device to perform operations comprising:

receiving a query having first information and second information, wherein the first information incudes sensitive information that is not permitted to be further communicated or stored per a regulation, and wherein the second information is permitted to be further communicated and stored;

parameterizing the query into a parameterized query to replace the first information with parameters, wherein the first information is occulted and represented by the parameters, wherein parameterization is based on data properties at least partially obtained from metadata associated with the query, wherein the data properties correspond to data types represented by the parameters, wherein the metadata includes historical data relating to the data types, wherein the historical data includes frequency at which the first information is detected in one or more queries;

transforming the parameterized query into an annotated query such that the parameters are annotated with decisions based on the data properties, wherein the decisions reveal protocols relating to one or more of joining of tables associated with data filtering out of one or more of the tables based on the data properties; and generating a final query based on the annotated query, wherein the final query is executed based on the annotated parameters and the annotated query is captured and stored without the first information.

14. The non-transitory computer-readable medium of claim 13, wherein the operations further comprise executing the final query in compliance with the regulation, wherein the regulation includes General Data Protection Regulation (GDPR).

15. The non-transitory computer-readable medium of claim 13, wherein the query comprises at least one of a Salesforce Object Query Language (SOQL)-based query, a Salesforce Query Search Language (SQSL)-based query, and a Sequential Query Language (SQL)-based query, wherein the final query is identical in structure and generated subsequently to a data fetching query that is generated in response to the query, wherein the data fetching query represents a first final query, while the final query represents a second final query.

16. The non-transitory computer-readable medium of claim 13, wherein the operations further comprise detecting the first information having data types, wherein the data types are specific to a user representing a tenant in a multi-tenant environment, wherein the query is placed at a client computing device using via user interface, wherein the user interface includes one or more of a graphical user interface (GUI), a web browser, and an application-based interface, and an application programming interface (API).

17. The non-transitory computer-readable medium of claim 16, wherein the data types of the first information comprise one or more of names, usernames, passcodes, identifying numbers, addresses, geographic locations, proprietary information, privileged information, and confidential material, wherein the data properties are used to access their associated data types in the database, wherein a data property associated with a data type reveals one or more attributes of the data type such that wherein a data type includes a name, the data property of the data type includes one or more of a frequency of usage of the name, a total number of names in a table having the name, and a name of the table where the name is stored.

18. The non-transitory computer-readable medium of claim 13, wherein the decisions are chosen at various stages of query generation and reveal one or more ways for reading the data types based on their associated data properties, wherein a decision for reading one or more data types includes one or more of joining of tables, filtering of one or more of the tables, using nested loops for joining of two or more of the tables, applying hash joins to join the two or more tables.

* * * * *